Nov. 1, 1938.  A. C. GRANT  2,134,940
PROPORTIONING COOLING SYSTEM
Filed Aug. 21, 1933
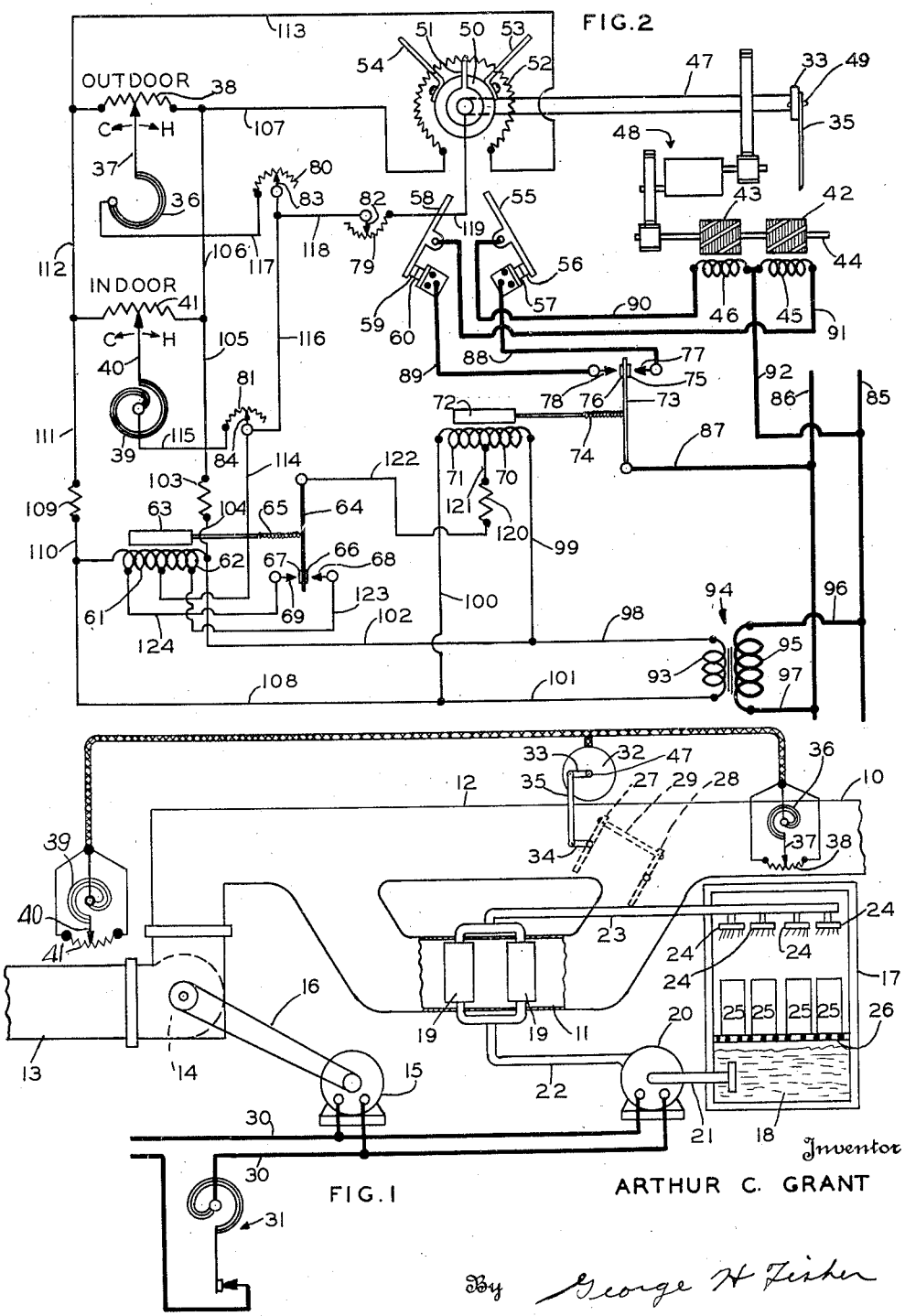
Inventor
ARTHUR C. GRANT
By George H. Fisher
Attorney Patented Nov. 1, 1938

2,134,940

UNITED STATES PATENT OFFICE 2,134,940

PROPORTIONING COOLING SYSTEM

Arthur C. Grant, St. Paul, Minn., assignor to Minneapolis-Honeywell Regulator Company, Minneapolis, Minn., a corporation of Delaware Application August 21, 1933, Serial No. 686,181

5 Claims. (Cl. 236—91)

The present invention relates to the art of cooling buildings and the like during the summer.

One of the broad objects of the invention is the provision of a cooling system in which the cooling apparatus is operated continuously when there is a demand for a cooling action and varying the rate of cooling according to the demand as distinguished from those systems in which the cooling apparatus is operated intermittently at varying frequencies to supply the desired cooling effect.

In prior art cooling systems, it has often been the practice to maintain the indoor temperature at a definite point regardless of how high the outdoor temperature may become. As an example, the indoor temperature has heretofore been maintained at say 75° irrespective of the outdoor temperature. In such a system, if the outdoor temperature should rise to say 95°, then there is a relatively large temperature differential between the indoor and outdoor temperatures and persons passing from the outdoors to the cooled building are chilled whereas persons passing from the cooled building to the outdoors become excessively uncomfortable as a result of the extreme temperature differential.

Another of the broader objects of the present invention therefore is the provision of a cooling system in which the indoor temperature is allowed to vary as the outdoor temperature varies. If desired, a substantially constant temperature differential may be maintained between the outdoor and indoor temperatures for all reasonably high outdoor temperatures although I prefer to maintain a variable differential between the outdoor and indoor temperature and one which increases as the outdoor temperature rises.

I preferably obtain the variable differential between outdoor and indoor temperatures by arbitrarily selecting a range within which it is permissible for the indoor temperature to vary and operating the cooling apparatus in such manner that the indoor temperature is maintained within this range. More specifically, I propose to proportion or modulate the amount of cooling supplied to a building in accordance with the value of the indoor temperature in relation to the range within which it is permissible or allowable for the temperature to vary.

For example, a temperature responsive device having an operative range of 13° from say 75° to 88° may be utilized to vary the effect of the cooling means so that minimum or no cooling is supplied when the indoor temperature is at 75° and maximum cooling is supplied when the indoor temperature rises to 88°, the cooling effect being proportioned or modulated for all intermediate temperatures. In such a system, when the outdoor temperature is at or below 75°, the indoor temperature will be at the same value and no cooling or minimum cooling will be supplied. Now, if the outdoor temperature should rise to 80°, the indoor temperature will begin to follow the rise in outdoor temperature and a larger amount of cooling will be supplied. However, this larger amount of cooling will be such as not to maintain the indoor temperature constant with the result that the temperature of the indoor will level off at some intermediate value, say 77°. In this manner, as the indoor temperature rises by reason of increasing outdoor temperatures, more and more cooling will be supplied in an attempt to maintain the indoor temperature within the desired range, and for each and every outdoor temperature the indoor temperature will level off at a point within the desired range. This point will gradually rise as the outdoor temperature increases but this rising will be at a rate depending upon the preselected permissible range of variation of indoor temperature and by properly choosing such ranges and the capacity of the cooling apparatus, any desired variable temperature differential may be maintained between indoor and outdoor temperatures.

There is, of course, a time delay or lag between changes in the outdoor temperature and the resulting changes in the indoor temperature. In some instances, it may be desirable to anticipate changes in the indoor temperature because of changes in the outdoor temperature and in my complete system I contemplate providing mechanism by which the amount of cooling is additionally varied by changes in the outdoor temperature in such manner that changes in the indoor temperatures are anticipated and the amount of cooling supplied to the building is varied before the temperature thereof has responded to the changes in outdoor temperature whereby to overcome the effects of lag between a call for more or less cooling and the actual effectiveness of such additional or decreased cooling.

A further object of the invention, therefore, is the provision of a cooling system in which the amount of cooling supplied to a building is varied in accordance with the fluctuations of the indoor temperature within a given or desired range and additionally controlling the cooling means to anticipate further fluctuations in the indoor temperature because of changes in the outdoor temperature.

In some cases, the cooling apparatus could be controlled entirely by means of changes in the outdoor temperature and another object of the invention is the provision of a cooling system in which the amount of cooling supplied to a building is varied directly as the result of changes in outdoor temperature. Preferably, the amount of cooling thus supplied is not great enough to maintain a constant indoor temperature, but one which increases at a lower rate than the outdoor temperature increases.

Where the night has been cool, resulting in a relatively low indoor temperature, it may happen that the outdoor temperature will rise considerably during the day before its effect is transmitted to the temperature of the inside of the building. Under such and other similar conditions it may be desirable to prevent operation of the cooling means until the indoor temperature has increased so as to come within the permissible range of fluctuation.

A further object of the invention, therefore, is the combination with the above described cooling system of a thermostatic device responsive to the indoor temperature and operative to prevent operation of the cooling means to cool the building or space whenever the indoor temperature is at or below the lower limit of the permissible range within which it is allowable for the indoor temperature to fluctuate.

Other objects of the invention include the various combinations and sub-combinations of elements as well as the electrical connections therebetween.

For a further understanding of the invention, reference may be had to the following description and accompanying drawing, in which:

Fig. 1 is a diagrammatic view of a cooling system arranged in accordance with the present invention, and Fig. 2 is a schematic wiring diagram of the internal mechanism of the control system used in connection therewith.

Referring first to Fig. 1, the cooling means includes duct means comprising an inlet duct 10 which branches to form a cooling duct 11 and a by-pass duct 12 which converge to form an outlet duct 13. A blower 14 of usual construction is located in the outlet duct 13 and is driven by an electric motor 15 through any suitable connecting means such as herein indicated by the drive belt 16. A cooling chamber generally indicated at 17 is provided with a cooling medium 18 such as water or brine which is circulated, by means of an electrically operated pump 20 and pipes 21 and 22, to a pair of cooling coils 19 located in the cooling duct 11. The cooling medium 18, after leaving cooling coils 19, passes through a pipe 23 and discharges from a plurality of spray heads 24 located in the cooling chamber 17. The sprayed cooling medium passes over ice blocks 25 which are supported within cooling chamber 17 by a perforated support 26 and then collects in the lower portion of the cooling chamber 17 for future circulation to the cooling coils 19. The use of the ice blocks 25 is to be understood as merely illustrative of any desired type of cooling means or apparatus for maintaining the cooling medium at a substantially constant temperature. The inlet duct 10 is provided with a pair of mixing dampers 27 and 28 which are connected by a link 29 so that the mixing dampers 27 and 28 move in unison.

Blower motor 15 and pump 20 are energized by line wires 30 which preferably include a reverse acting thermostat 31 which opens the circuit thereto when the indoor or space temperature falls to a predetermined degree for reasons which will hereinafter become apparent.

It will therefore be apparent that pump 20 normally constantly circulates the cooling medium 18 through the cooling coils 19 and over the ice blocks 25 whereby the temperature of the cooling medium 18 and cooling coils 19 is maintained substantially constant. The blower 14 likewise normally constantly withdraws air from the outside through inlet duct 10 and thereafter a portion of this air passes through by-pass duct 12 and another portion thereof passes through cooling duct 11 and over cooling coils 19 where it is cooled and thereafter the cooled air and the by-passed air are mixed and pass out of discharge duct 13 into the space or building to be cooled. The proportion of by-passed air to that of the total air circulated is dependent upon the setting of mixing dampers 27 and 28. However, if the indoor or space temperature becomes too low for any reason whatsoever, the reverse acting thermostat 31 opens the circuit to blower motor 15 and pump motor 20 to prevent further cooling of the space and to render the cooling means inoperative.

The mixing dampers 27 and 28 are controlled by a control mechanism 32 in the form of a motor means which operates a crank arm 33 that is connected to an actuating lever 34 by means of a link 35. The motor means 32 is controlled by the conjoint action of two thermostats.

One of these thermostats is an outdoor thermostat and comprises a bimetallic volute 36 which responds to the outdoor temperature and may be conveniently placed within the intake duct 10. The bimetallic volute 36 controls a movable member 37 which takes the form of a contact finger and is adapted to sweep across a resistance 38 on changes in the outdoor temperature. In a similar manner, the second thermostat is an indoor thermostat and includes a bimetallic volute 39 which responds to the temperature of the space or building to be cooled. This bimetallic volute controls a movable member 40 which takes the form of a contact finger that is adapted to sweep across a resistance 41 on changes in the space temperature.

Turning now to Fig. 2, the motor means includes a pair of reversibly rotating induction motors having rotors 42 and 43 mounted upon a common rotor shaft 44. Field windings for rotors 42 and 43 are indicated at 45 and 46. The rotor shaft 44 drives an operating shaft 47 through a suitable reduction gear train indicated generally at 48. The crank 33 is secured to operating shaft 47 in any desirable manner and the link 35 is pivoted thereto as indicated at 49. The operating shaft 47 carries a drum 50 of insulating material to which is secured a contact finger 51 hereinafter referred to as a balancing contact finger and which cooperates with a stationary circular resistance 52, sweeping thereacross upon rotation of operating shaft 47. The drum 50 also carries a pair of adjustable limit switch actuators 53 and 54. Upon clockwise rotation of operating shaft 47 (as viewed from the left) the limit switch actuator 53 is adapted to engage a pivoted contact arm 55 which carries a contact 56 that cooperates with a stationary contact 57. In a similar manner, upon rotation of operating shaft 47 in the reverse direction, limit switch actuator 54 is adapted to engage a pivoted contact arm 58 which carries a contact 59 that cooperates with a stationary contact 60.

The control means further includes a balanced solenoid which is herein shown as comprising a pair of solenoid windings 61 and 62 which conjointly control an armature 63. Armature 63 is connected to flexible switch arm 64 through a coiled spring 65. Flexible switch arm 64 carries a pair of contacts 66 and 67 which are adapted to engage a pair of stationary contacts 68 and 69 upon reverse movement of armature 63.

The control system further includes a balanced relay herein shown as comprising a pair of relay coils 70 and 71 which conjointly control an armature 72. The armature 72 controls a relay switch arm 73 through a coiled spring 74. Relay switch arm 73 carries a pair of contacts 75 and 76 which are adapted to engage a pair of relatively stationary contacts 77 and 78 upon reverse movements of armature 72. For purpose of adjustment, the control system includes three manually operable rheostats which include resistances 79, 80 and 81 and cooperating contact fingers 82, 83 and 84.

High voltage electrical power is supplied by line wires 85 and 86. Line wire 86 is connected to relay switch arm 73 by a wire 87. The relatively stationary contacts 77 and 78 are connected to stationary limit switch contacts 57 and 60 by means of wires 88 and 89. Limit switch contact arms 55 and 58 are respectively connected to one end of the motor field windings 46 and 45 respectively by wires 90 and 91. The other ends of field windings 45 and 46 are connected to line wire 85 by a wire 92.

The control circuits are all low voltage and obtain their power from the low voltage secondary 93 of a step-down transformer 94, the high voltage primary 95 of which is connected to line wires 85 and 86 by wires 96 and 97.

Relay coils 70 and 71 are connected directly across secondary 93, in series, by means of wires 98, 99, 100 and 101. One end of solenoid coil 62 is connected to one side of secondary 93 by means of wires 98 and 102 and is also connected to one end of indoor resistance 41, one end of outdoor resistance 38 and one end of balancing resistance 52 through a protective resistance 103 by means of wires 104, 105, 106 and 107. In a similar manner, one end of solenoid coil 61 is connected to the other side of secondary 93 by wires 101 and 108 and is connected to the other ends of indoor resistance 41, outdoor resistance 38 and balancing resistance 52 through a protective resistance 109 by means of wires 110, 111, 112 and 113. The other ends of solenoid windings 61 and 62 are connected together and their junction, bimetallic volute 39, bimetallic volute 36 and balancing contact finger 51 are all interconnected through the three manually controlled rheostats, by wires 114, 115, 116, 117, 118 and 119.

The junction of relay windings 70 and 71 is connected to flexible switch arm 64 through a protective resistance 120 by wires 121 and 122. Contact 68 is connected near one end of solenoid winding 62 by a wire 123 and contact 69 is connected near one end of solenoid winding 61 by a wire 124.

By omitting the outdoor thermostat and its connections for the present, it will be noted that movable member or contact finger 40 is engaging the central portion of indoor resistance 41. The bimetallic volute 39 and the resistance 41 are preferably arranged so that movable member 40 will completely traverse resistance 41 upon a temperature change of approximately 13°. This 13° temperature change represents the temperature range within which it is desired to allow the temperature of the space to fluctuate. The space temperature is intermediate these permissible limits, balancing finger 51 is engaging the central portion of balancing resistance 52 and mixing dampers 27 and 28 are in such position that substantially equal quantities of air pass through cooling duct 11 and by-pass duct 12 whereby the space is being cooled continually at one half the capacity of the cooling system. This amount of cooling is just sufficient to maintain the indoor temperature constant for the particular outdoor temperature. Solenoid windings 61 and 62 are equally energized and flexible switch arm 64 is therefore in its intermediate position wherein contacts 66 and 67 are out of engagement with contacts 68 and 69. Relay windings 70 and 71 are therefore equally energized and relay switch arm 73 is in its mid-position wherein contacts 75 and 76 are out of engagement with contacts 77 and 78.

If the outdoor temperature should now increase, the space temperature will thereafter begin to rise and movable member 40 will move towards the right hand end of resistance 41 as viewed in Fig. 2. Such movement of movable member 40 unbalances the voltage drops across solenoid windings 61 and 62 to increase the voltage drop across solenoid winding 61 and decrease the voltage drop across solenoid winding 62 whereupon armature 63 moves towards the left and brings contact 67 into engagement with contact 69. Such engagement of contact 67 with contact 69 completes a shunt circuit around relay winding 71 which shunt circuit comprises the wire 121, protective resistance 120, wire 122, flexible switch arm 64, contact 67, contact 69, wire 124, a small portion of solenoid winding 61, wire 108 and wire 101 to one side of secondary 93. The current flow through this shunt circuit somewhat increases the pull upon armature 63 to increase the contact pressure between contacts 67 and 69 so that there is a good firm contact therebetween. Inasmuch as this shunt circuit is in parallel with relay winding 71, this relay coil becomes energized to a smaller extent than the relay coil 70 whereupon armature 72 moves towards the right and brings contact 75 into engagement with contact 77. A circuit is thereby established through field winding 46 as follows: line wire 86, wire 87, relay switch arm 63, contact 75, contact 77, wire 88, limit switch contacts 57 and 56, wire 90, field winding 46 and wire 92 to line 85. Energization of field winding 46 causes rotor 43, through reduction gear train 48, to slowly rotate operating shaft 47 in a clockwise direction as viewed from the left in Fig. 2. Such rotation of operating shaft 47 moves balancing contact finger 51 along balancing resistance 52 until the voltage drops across solenoid windings 61 and 62 have been rebalanced whereupon armature 63 moves to the position shown in the drawing to break the shunt circuit which is in parallel with relay winding 71 whereby armature 72 returns to the position shown in the drawing and field winding 46 is deenergized. During this time, crank arm 33 has rotated in a counter-clockwise direction as viewed in Fig. 1 to readjust mixing dampers 27 and 28 to allow more air to pass through cooling duct 11 and less air to pass through by-pass duct 12. In this manner, a greater cooling effect will be supplied to the space in an attempt to maintain the space temperature at its new value.

The parts are preferably so arranged that the space temperature will rise at a rate more slowly than the outdoor temperature. In this manner, as the outdoor temperature rises, the movable member 40 positioned by the room thermostatic bimetallic volute 39 will continually cause adjustment of mixing dampers 27 and 28 to keep the space temperature within the desired limits.

If the outdoor temperature should fall, then the reverse action will take place in that the space will become too cool and movable member 40 will move along resistance 41 towards the left end thereof. When this happens, the voltage drops across solenoid windings 61 and 62 will again be unbalanced but in the opposite direction,—i. e. the voltage drop across solenoid winding 62 will be increased and the voltage drop across solenoid winding 61 will be decreased. Armature 63 will thereupon move to the right and move flexible switch arm 64 in the same direction to bring contact 66 into engagement with contact 68. Such engagement of contacts 66 and 68 establishes a shunt circuit for relay winding 70 through wire 121, protective resistance 120, wire 122, flexible switch arm 64, contact 66, contact 68, wire 123, a small portion of solenoid winding 62, wire 102, and wire 98 to one side of secondary 93. The full current flow through relay winding 70 and through this shunt circuit will thereupon traverse relay winding 71 resulting in movement of armature 72 towards the left. Contact 76 is therefore moved into engagement with contact 78 to establish an energizing circuit for field winding 45 as follows: line wire 86, wire 87, relay switch arm 73, contact 76, contact 78, wire 89, limit switch contacts 60 and 59, wire 91, field winding 45 and wire 92 to line wire 85. Rotor 42 thereupon rotates operating shaft 47 in the reverse direction to move balancing contact finger 51 along balancing resistance 52 towards the left end thereof to rebalance the voltage drops across solenoid windings 61 and 62 whereby the shunt circuit for coil 70 and energizing circuit for field winding 45 are broken. This movement readjusts mixing dampers 27 and 28 to allow a larger flow of air through by-pass duct 12 and a smaller flow of air through cooling duct 11.

It will therefore be seen that if the outdoor thermostat and its connections are omitted, mixing dampers 27 and 28 assume a definite position for every space temperature within the range of operative movement of movable member 40. The effect of the cooling means upon the space is therefore similarly varied for every space temperature within the desired range of fluctuation. By properly selecting the range of space temperature represented by movement of movable member 40 completely across resistance 41 and by properly choosing the cooling capacity of the cooling means and the rate of travel of mixing dampers 27 and 28, the space temperature can be made to follow the outdoor temperature so that a constant differential or a variable differential is maintained therebetween. I prefer to arrange the parts in such manner that the differential between the outdoor and space temperatures increases as the outdoor temperature rises in such manner that the differential is negligent at an average summer temperature of about 75° and is appreciable although not excessive at the high outdoor summer temperatures of 95° to 100°.

The protective resistances 103 and 109 prevent complete short circuiting of relay coils 62 and 61 respectively upon extreme movements of movable member 40 along resistance 41 and the protective resistance 120 limits the maximum current flow through the above described shunt circuits. The limit switches limit the extreme movements of operating shaft 47 in the usual manner and are preferably adjustable so that field windings 45 and 46 will be deenergized when mixing dampers 27 and 28 have reached their limits of movement.

Now if the indoor or space thermostat be neglected, it will be noted that the outdoor thermostat is connected in the same manner as the indoor thermostat or, to state it otherwise, the indoor thermostat could be moved so as to respond to outdoor temperatures. In such a case, it will be seen that the cooling effect of the cooling means will vary directly in accordance with the changes in outdoor temperature whereas in the case where the indoor thermostat is used, the changes in outdoor temperature need first be manifested by resulting changes in the indoor temperature before the cooling means is adjusted. Here again by properly coordinating the various parts, the indoor temperature may be made to follow the outdoor temperature to maintain a variable or constant differential and might even be made to remain constant if the capacity of the cooling means is made large enough.

In the preferred embodiment of the invention both an indoor thermostat and an outdoor thermostat are utilized. When this is done, it will be evident that immediately upon a rise in outdoor temperature, resulting in movement of movable member 37 towards the right end of resistance 38, the mixing dampers 27 and 28 will be adjusted slightly to allow more air to flow through the cooling duct 11 and over the cooling coils 19. After a time, this rise in outdoor temperature will influence the indoor temperature and if the increase in the rate of cooling has not been sufficient to offset this rise in outdoor temperature, then movable member 40 will move along resistance 41 towards the right end thereof and cause a further adjustment of the mixing dampers 27 and 28 to again increase the cooling effect of the cooling means. In this manner, when both an outdoor and an indoor thermostat are utilized, the outdoor thermostat might be considered as an anticipating thermostat by means of which the cooling means is adjusted upon changes in the outdoor temperature in anticipation of changes in the indoor temperature. If this anticipation is not sufficient to offset the effect of a change in outdoor temperature upon the indoor temperature, then the indoor thermostat responds to the change in indoor temperature and operates the cooling means to maintain the indoor temperature within the desired range.

I preferably so arrange the response of indoor and outdoor thermostats that the outdoor thermostat has less influence on the adjustment of the mixing dampers 27 and 28 than does the indoor thermostat. This action is illustrated in the drawing by showing a greater amount of bimetal in the indoor thermostat with the result that whereas an indoor temperature change of approximately 13° causes movable member 40 to completely traverse resistance 41, an outdoor temperature change of approximately 26° is required before movable member 37 will completely traverse the similar resistance 38.

The three manual rheostats are desirable in any commercial application of the system in order that the action of the system may be adjusted. By changing the setting of contact finger 84 on resistance 81, the effect of a given movement of movable member 40 may be changed so as to require a larger or smaller movement thereof to obtain a given movement of mixing dampers 27 and 28. In a similar manner, adjustment of contact finger 83 along resistance 80 will change the amount of movement of movable member 37 necessary to obtain a given movement of mixing dampers 27 and 28. Adjustment of contact finger 82 along resistance 79 determines the amount of movement necessary by balancing contact finger 51 along balancing resistance 52 to rebalance solenoid windings 61 and 62 after they have been unbalanced by movement of either or both of movable members 37 and 40. The amount of movement of balancing contact finger 51 in turn governs the movement of mixing dampers 27 and 28.

From the foregoing description, it will be evident that this system is one having peculiar commercial value in that it is extremely flexible and can be adjusted by simple means so as to adapt it to any particular installation. The control may be by means of the indoor thermostat only or of the outdoor thermostat only but in some instances it may be desirable and preferable to utilize both of the thermostats for the reasons heretofore pointed out.

It is to be expressly understood that the cooling mechanism herein shown and described is one which is particularly suitable for test purposes in a laboratory and the like and there is no intention to be limited to the particular cooling apparatus disclosed inasmuch as any other of the well known cooling means and manner of cooling them could be readily substituted for the present cooling means and the mixing dampers 27 and 28 by which the effect of the cooling means is varied. It should be noted that in this system, under normal conditions, the cooling effect is proportioned or modulated by operating the cooling means continuously, under normal conditions, at varying rates rather than operating the same intermittently at maximum capacity at varying frequencies.

In some instances it may be desired to recirculate the indoor air rather than to take in fresh outdoor air and in such a case the inlet duct 10 would terminate within the space to be cooled. If an outdoor thermostat should be used in such a system, it will be evident that it must be located out-of-doors rather than in the recirculated air duct.

While a specific embodiment of the invention has been herein described, it is to be expressly understood that many changes could be made herein by those skilled in the art and I am therefore to be limited only by the scope of the appended claims.

I claim as my invention:

1. In combination, cooling means for cooling a space to be cooled, a movable member having a predetermined range of operative movement, space temperature responsive means in control of said movable member and adapted to move the same through its operative range of movement upon change in the space temperature over a relatively wide allowable range of fluctuation during warm weather, control means associated with said movable member and cooling means and controlled by the former to operate the latter to supply maximum cooling when said movable member is at one of the limits of its range of operative movement, to supply minimum cooling when said member is at its other limit of its range of operative movement and to supply variable cooling as said movable member traverses its range of operative movement, a second movable member having a predetermined range of operative movement, outdoor temperature responsive means in control of said second movable member and adapted to move the same through its operative range of movement upon a change in outdoor temperature which is larger than said space temperature change, and control means associated with said second movable member and cooling means to operate said cooling means upon an increase in outdoor temperature to supply a larger cooling effect than that demanded by said first movable member whereby said second movable member anticipates changes in the space temperature.

2. In combination, cooling means for cooling a space to be cooled, a movable member having a predetermined range of operative movement, space temperature responsive means in control of said movable member and adapted to move the same through its operative range of movement upon change in the space temperature over a relatively wide allowable range of fluctuation during warm weather, control means associated with said movable member and cooling means and controlled by the former to operate the latter to supply maximum cooling when said movable member is at one of the limits of its range of operative movement, to supply minimum cooling when said member is at its other limit of its range of operative movement and to supply variable cooling as said movable member traverses its range of operative movement, a second movable member having a predetermined range of operative movement, outdoor temperature responsive means in control of said second movable member and adapted to move the same through its operative range of movement upon a change in outdoor temperature which is larger than said space temperature change, control means associated with said second movable member and cooling means to operate said cooling means upon an increase in outdoor temperature to supply a larger cooling effect than that demanded by said first movable member whereby said second movable member anticipates changes in the space temperature, and a space temperature responsive thermostat which operates at a definite minimum space temperature associated with said cooling means for preventing cooling of said space when the space temperature is at said minimum irrespective of the outdoor temperature.

3. In combination, cooling means for cooling a space, motor means for varying the effectiveness of said cooling means, normally balanced electrical means in control of said motor means, a variable resistance space temperature responsive thermostat for unbalancing said normally balanced electrical means, variable resistance outdoor temperature responsive thermostat for additionally unbalancing said normally balanced electrical means, and variable resistance means controlled by said motor means for rebalancing said normally balanced electrical means.

4. In combination, cooling means for cooling a space, motor means for graduatingly varying the effectiveness of said cooling means, means for controlling said motor means including normally balanced electrical means and follow-up means controlled by said motor means for rebalancing said electrical means, a first adjustable potentiometer, means responsive to variations in space temperature for adjusting the first adjustable potentiometer in accordance with variations in space temperature, a second adjustable potentiometer, means responsive to variations in temperature outside of the space for adjusting the second adjustable potentiometer in accordance with variations in outside temperature, and means for connecting said first and second adjustable potentiometers in parallel to said normally balanced electrical means to vary graduatingly the effectiveness of the cooling means in accordance with variations in space and outside temperatures.

5. In combination, cooling means for cooling a space, motor means for graduatingly varying the effectiveness of said cooling means, normally balanced electrical means in control of said motor means, a first adjustable potentiometer, means responsive to variations in space temperature for adjusting the first adjustable potentiometer in accordance with variations in space temperature, a second adjustable potentiometer, means responsive to variations in temperature outside of the space for adjusting the second adjustable potentiometer in accordance with variations in outside temperature, a third adjustable potentiometer, means operated in accordance with the effectiveness of the cooling means for adjusting the third adjustable potentiometer to rebalance said electrical means, and means for connecting the first, second, and third potentiometers in parallel to the normally balanced electrical means to vary graduatingly the effectiveness of the cooling means in accordance with variations in space and outside temperatures.

ARTHUR C. GRANT.